June 10, 1924.
H. R. DAVIES
FUEL LEVEL INDICATOR
Filed Feb. 20, 1920
1,497,291
2 Sheets-Sheet 1
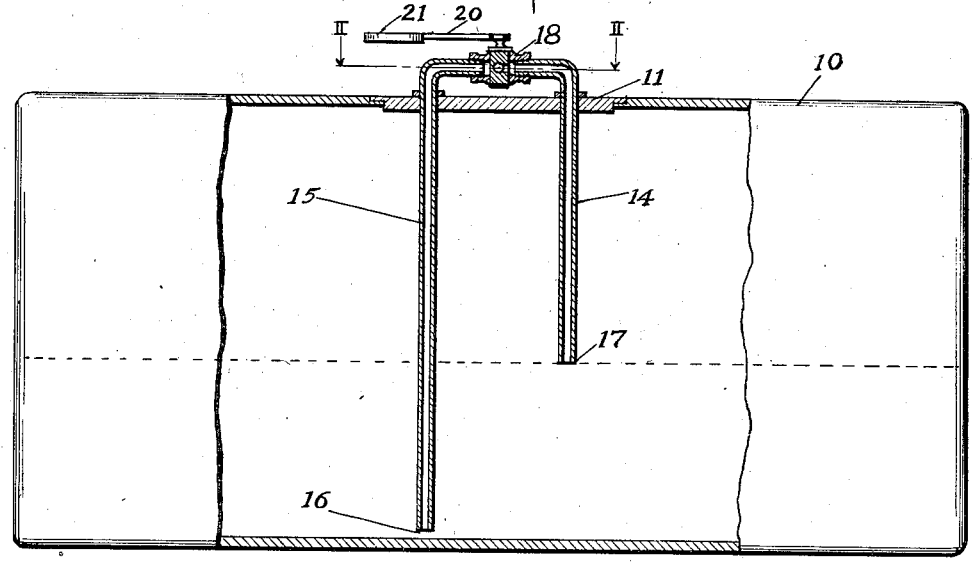
Fig. I.
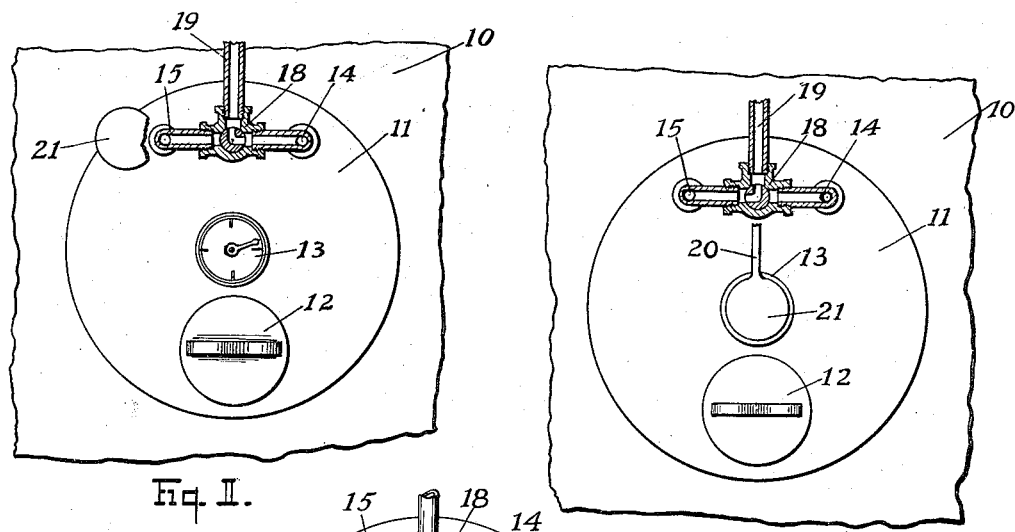
Fig. II.
Fig. III.
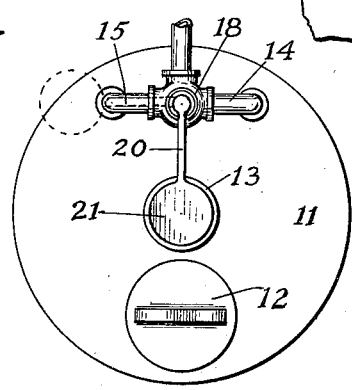
Fig. IV.
INVENTOR.
Henry R. Davies
BY Chester H Braselton
ATTORNEY June 10, 1924.
H. R. DAVIES
1,497,291
FUEL LEVEL INDICATOR
Filed Feb. 20, 1920   2 Sheets-Sheet 2
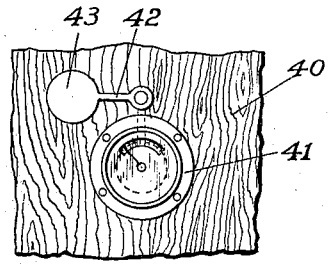
Fig. VI.
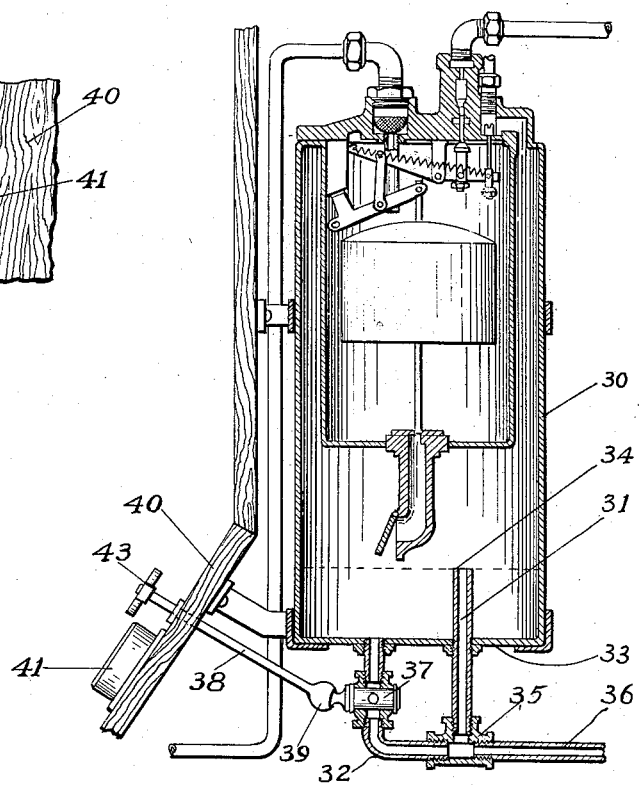
Fig. V.
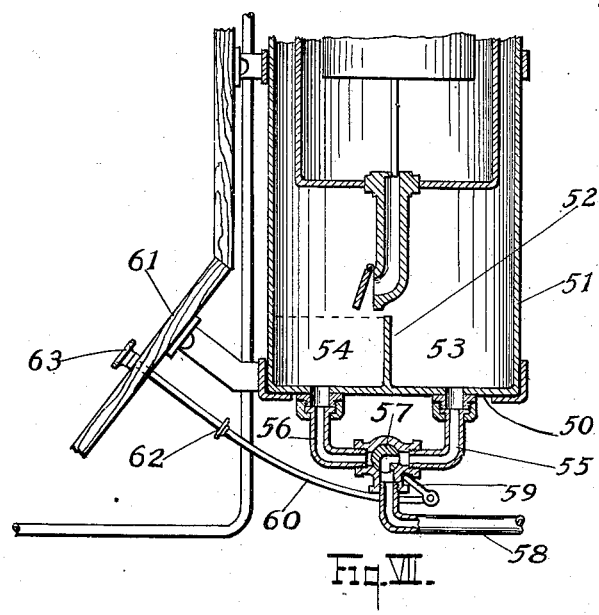
Fig. VII.
INVENTOR.
Henry R. Davies
BY Chester H. Braselton
ATTORNEY Patented June 10, 1924.

1,497,291

UNITED STATES PATENT OFFICE.

HENRY R. DAVIES, OF TOLEDO, OHIO, ASSIGNOR TO INDUSTRIAL RESEARCH CORPORATION, OF TOLEDO, OHIO, A CORPORATION OF DELAWARE.

FUEL-LEVEL INDICATOR.

Application filed February 20, 1920. Serial No. 360,143.

*To all whom it may concern:*

Be it known that I, HENRY R. DAVIES, a citizen of the United States, residing at Toledo, in the county of Lucas and State of Ohio, have invented certain new and useful Improvements in Fuel-Level Indicators, of which I declare the following to be a full, clear, and exact description.

This invention relates to liquid reserve supply indicators, particularly as applied to the fuel supply tanks of internal combustion engines.

The object of this invention is to provide means for giving positive indication when the liquid in the tank falls to a predetermined level.

Another object is to provide signalling means to indicate when the level indicator is in inoperative position.

Further objects, and objects relating to economies of manufacture and details of construction will definitely appear from the detailed description to follow.

Stated broadly, the invention consists in a tank to which a two passage outlet is applied so that a falling liquid level will reach the ends of the passages at different times. The two passages combine without the tank into a single conduit, and adjacent the junction point a valve is interposed operable to close one or either of the passages. When the falling liquid level reaches one of these passages, liquid ceases to flow and a positive indication is given through cessation of proper functioning of the system. By attaching a signal arm to this valve it is made apparent when the valve is in inoperative position.

A structure constituting a preferred embodiment of my invention is illustrated in the accompanying drawing forming a part of my invention in which—

Figure I is an elevation of a tank with a portion broken away to show a preferred form of the device.

Fig. II is a top view of the device showing the valve structure in normal position.

Fig. III is a similar view with the valve in abnormal position.

Fig. IV shows a plan view of the device.

Fig. V is a sectional view of the invention as applied to an automobile vacuum tank and instrument board.

Fig. VI shows the signal adjacent a meter on the instrument board, and

Fig. VII is a section of a second modification.

Similar reference characters refer to similar parts throughout the different views. For ease in description, the device will be described as applied to an automobile fuel tank, but it is not necessarily limited to this use. Considering the invention in detail the liquid retainer or tank is designated by the numeral 10. The top of the tank is apertured to receive a plate 11, which plate is in turn apertured to receive the filling cap 12, fluid depth gauge 13, and outlet pipes 14 and 15.

In the arrangement as shown the feed to the carbureter is assumed to be of the vacuum type in which case the tank outlets are preferably at the top, the pipes extending within the tank to different levels as at 16 and 17.

The gauge 13 may be of any conventional type, the mechanism of its operation being immaterial to my invention.

The outlet pipes 14 and 15 are bent after emergence from the tank and coupled with a two-way valve 18, having attachment with a single outlet pipe 19. Rotation of the valve permits successive connection of the outlet pipe 19 with either of the two pipes 14 or 15.

Means for rotating the valve consists in a lever arm 20 having an enlarged terminal 21 here shown as a disk. In order to accomplish a purpose of my invention, I make this disk of sufficient area to cover the dial of the depth gauge so that attention is drawn to the signal when in this particular position. In addition the disk may be colored to give it added prominence, though this is unnecessary for effective use.

In the operation of this system when the valve is placed in normal position as shown in Fig. 2, the suction through the pipe line to the tank is transmitted through the pipe 19, valve 18, and branch pipe 14 to the level 17 of the tank. When the liquid has been drawn out to this depth at the end of the pipe 14, air only will pass and the engine will stop. This affords a positive indication to the operator that there is a definite reserve of fuel remaining which will permit him to drive a certain distance before complete exhaustion of the supply thereof. By moving the lever arm of the valve to the position shown in Figs. III and IV the supply line has access to the base of the tank through the pipe 15, thereby permitting utilization of the reserve.

The use of the gauge system alone is common on automobile tanks, but the disadvantage in this use lies in the fact that the driver will fail to observe the reading of the gauge when necessary to prevent complete depletion of the fuel supply. It is also common to employ means for signalling a definite reserve of fuel to the driver, but the use of this device alone prevents knowledge of the supply prior to an extended use of the machine as on an automobile trip. In addition when the valve is opened to the reserve supply it will remain in that position after the tank has been filled unless the driver thinks to turn it.

By the use of these two devices in conjunction with the shutter disc 21, the advantages of both are retained, as when filling the tank the driver in order to read the gauge 13 necessarily moves the disc, thereby placing the valve in normal operative position, with the suction line extending through the branch pipe 14.

In the modification illustrated in Figs. V and VI, I have shown my invention applied to a conventional vacuum tank 30. In this case there is gravity flow and I therefore apply the branch pipe connections 31 and 32 to the base 33.

One branch pipe 31 extends within the tank above the base to a point 34, the other end of said branch having connection with a T coupling 35 connecting the main outlet pipe 36 and the other branch pipe 32.

A rotary valve 37 is inserted in the branch 32, which valve is operable by means of a rod 38 working through a universal joint 39. The rod extends through the instrument board 40 at a point adjacent the depth gauge 41. In case there is no fuel tank gauge on the instrument board, any other instrument will serve. A lever arm 42 and disc 43 is secured to the end of the rod and these parts are so dimensioned that rotation of the rod brings the disk over the meter obstructing vision thereof.

In the modification of Fig. VII the principle of partitioning the tank is employed. The base 50 of the tank 51 carries a partition 52 extending upwards across a median line in the tank to a distance short compared to the tank height. In this way the lower tank is divided into two portions 53 and 54, and leading from the bases of these two portions are branch outlet pipes 55 and 56, the two making a junction in the T-shape two-way valve 57. The valve 60 has connection with the main outlet pipe 58 so that the tank liquid has exit by either branch pipe through the main pipe by means of the valve.

In the particular form shown the valve 57 has connection with a short lever arm 59, which in turn is pivotally connected to a push rod 60 extending through the instrument board or dash 61. Limiting stops 62 and 63 are provided on the rod, the latter forming the handle for operating the device.

For a given set position of the valve, when the tank base portion 53 or 54 is emptied, the driver merely operates the rod to the other position to use the remainder of the fuel supply. When filled the tank is automatically in operative position because either portion 53 or 54 has a capacity similar to the other.

Having described my invention, what I claim as new and desire to secure by Letters Patent, is:—

1. In a reserve tank system, the combination of a liquid retaining tank, a pipe in the top of said tank having an end extending within to a point adjacent the base of the tank, a second pipe in the top of the tank having an end extending within to a point above the end of the first mentioned pipe, a common outlet pipe for said within extending pipes, a two-way valve intermediate said outlet pipe and said within extending pipes, a liquid depth indicator dial in said tank adjacent the valve, and means associated with said valve for preventing observation of said dial when the passage way of the longer inner pipe is open.

2. In a reserve tank system, the combination of a tank, two branch outlet pipes connected to the said tank, said pipes having access to different levels within the tank, a common main outlet pipe connected to said branch pipes, a valve intermediate the main pipe and one of the branch pipes for closing the outlet passage at will, fluid level indicating means for said tank, and additional signalling means associated with the valve adapted to make inoperative said level indicating means when the valve is in open position.

In testimony whereof, I affix my signature.

HENRY R. DAVIES.